(12) United States Patent
Sjöberg et al.

(10) Patent No.: US 7,939,752 B2
(45) Date of Patent: May 10, 2011

(54) ELONGATED MEMBER AND USE THEREOF

(75) Inventors: Peter Sjöberg, Ludvika (SE); Gerd A. Chalikiá, Ludvika (SE); Roger Hedlund, Ludvika (SE)

(73) Assignee: ABB Technology Ltd., Zürich (CH)

( * ) Notice: Subject to any disclaimer, the term of this patent is extended or adjusted under 35 U.S.C. 154(b) by 292 days.

(21) Appl. No.: 12/297,765

(22) PCT Filed: Apr. 10, 2007

(86) PCT No.: PCT/EP2007/053442
§ 371 (c)(1),
(2), (4) Date: Oct. 20, 2008

(87) PCT Pub. No.: WO2007/122099
PCT Pub. Date: Nov. 1, 2007

(65) Prior Publication Data
US 2009/0173515 A1    Jul. 9, 2009

(30) Foreign Application Priority Data
Apr. 20, 2006   (EP) .................................... 06112828

(51) Int. Cl.
*H01B 7/17* (2006.01)
(52) U.S. Cl. ............ 174/12 BH; 174/31 R; 174/11 BH; 174/142; 174/14 BH; 174/167
(58) Field of Classification Search ................ 174/31 R, 174/31.5, 11 BH, 12 BH, 14 BH, 142, 153 R, 174/152 R, 167, 650, 176, 189, 174, 137 R; 156/69
See application file for complete search history.

(56) References Cited

U.S. PATENT DOCUMENTS

| | | | |
|---|---|---|---|
| 3,973,077 A * | 8/1976 | Classon | 174/15.3 |
| 4,629,822 A * | 12/1986 | Kitamura | 174/12 BH |
| 5,466,890 A * | 11/1995 | Stagnitti | 174/84 R |
| 5,466,891 A * | 11/1995 | Freeman et al. | 174/142 |
| 6,140,573 A * | 10/2000 | Smith et al. | 174/31 R |
| 7,495,172 B2 * | 2/2009 | Amerpohl | 174/73.1 |

FOREIGN PATENT DOCUMENTS

| | | |
|---|---|---|
| EP | 0971372 A | 1/2000 |
| GB | 1445025 A | 8/1976 |

OTHER PUBLICATIONS

PCT/ISA/210—International Search Report—Jul. 26, 2007.
PCT/IPEA/409—International Preliminary Report on Patentability—Jul. 31, 2008.

* cited by examiner

*Primary Examiner* — Dhiru R Patel
(74) *Attorney, Agent, or Firm* — Venable LLP; Eric J. Franklin

(57) ABSTRACT

An elongated member including an outer sleeve-like rigid insulator shell surrounding a high voltage conductor extending in the longitudinal direction of the shell and a gap inside the shell next to an internal wall of the shell at least partially surrounding the conductor and filled with a medium including a material of with electrically insulating properties. The medium is formed by an electrically insulating material including hollow spaces at least partially filled with gas. The material is adapted to expand upon a temperature rise thereof by reversibly compressing the hollow spaces and reducing the volume thereof.

28 Claims, 2 Drawing Sheets

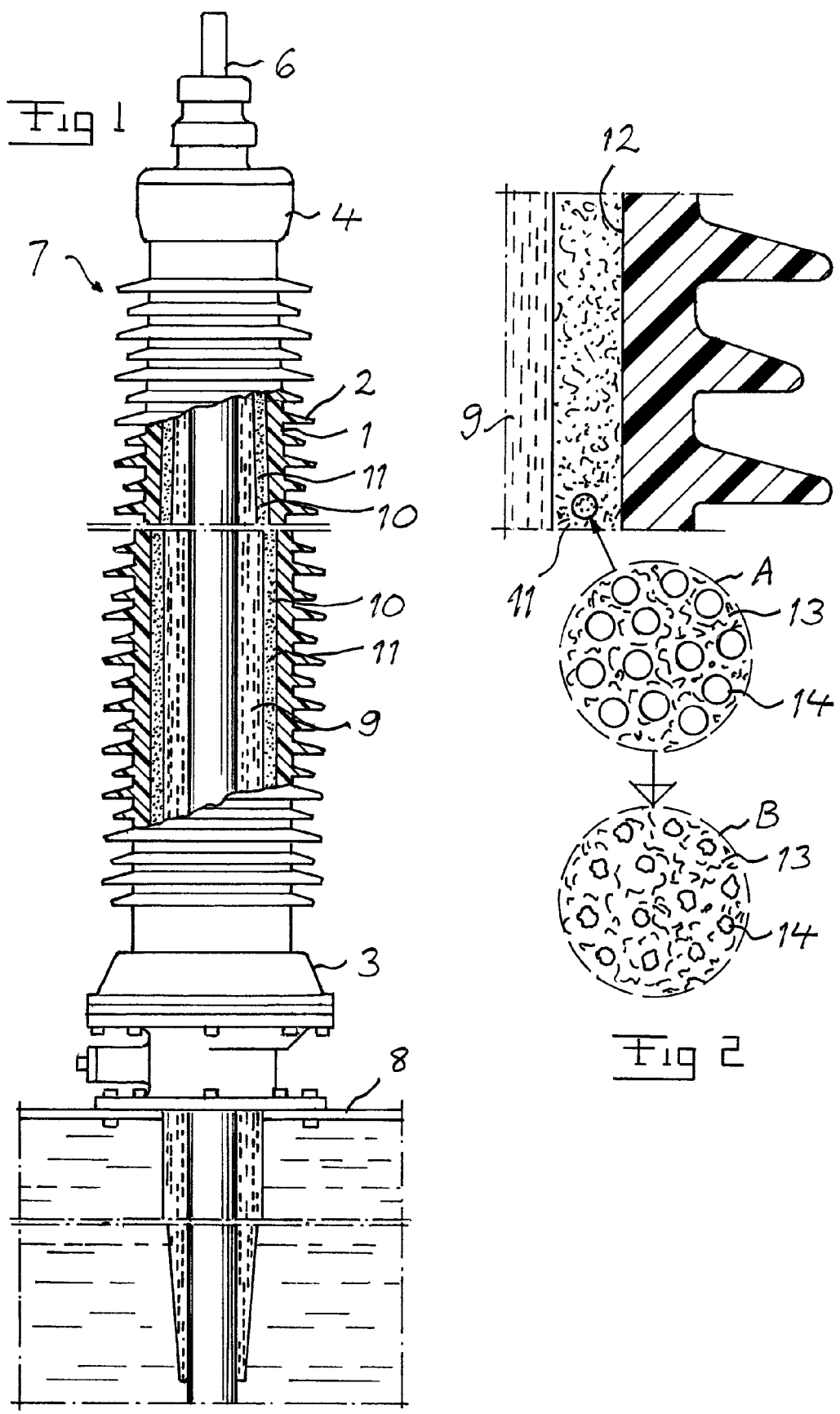

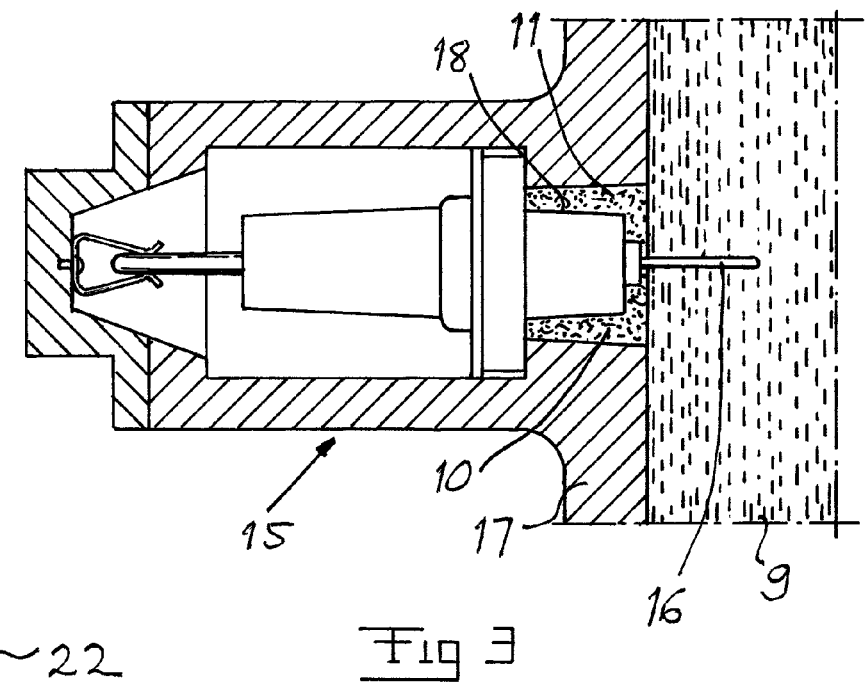
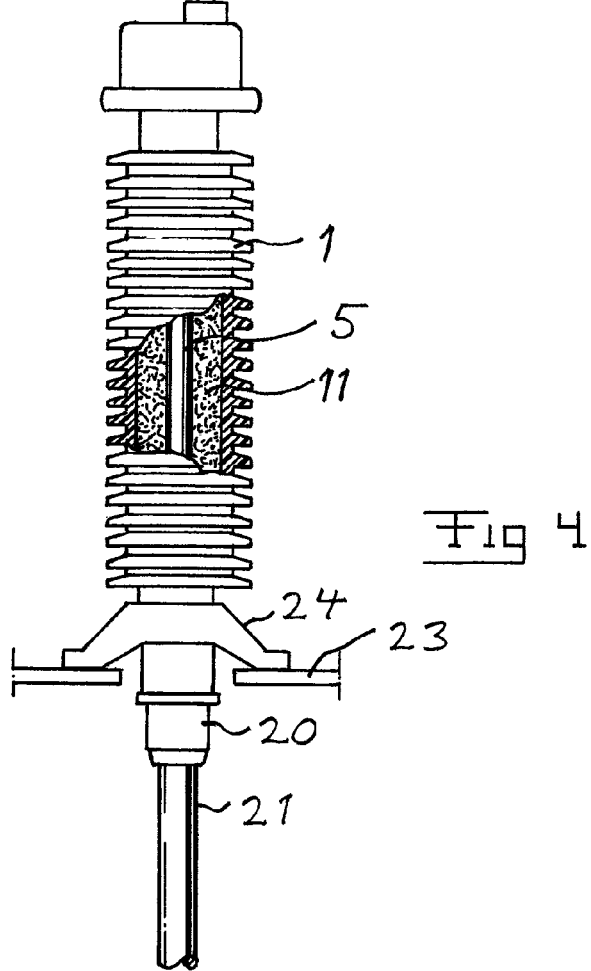

ELONGATED MEMBER AND USE THEREOF

CROSS REFERENCE TO RELATED APPLICATION

This application claims priority to European patent application number 06112828.6 filed 20 Apr. 2006 and is the national phase under 35 U.S.C. §371 of PCT/EP 2007/053442 filed 10 Apr. 2007.

TECHNICAL FIELD OF THE INVENTION AND PRIOR ART

The present invention relates to an elongated member having an outer sleeve-like rigid insulator shell surrounding a high voltage conductor extending in the longitudinal direction of the shell and a gap inside the shell next to the internal wall of the shell at least partially surrounding said conductor and filled with a medium of a material with electrically insulating properties.

The invention is directed to any such member where a high voltage is to be shielded with respect to the environment for preventing flash-overs from occurring to equipment, casings or other objects normally being connected to earth.

An example of such a member is a bushing connecting a transformer to a high voltage network, in which it is essential to shield the high voltage of the conductor to be connected to the high voltage network to a location at a considerable distance, such as for example 4 meters, from the transformer.

Cable terminations and High voltage apparatuses are other examples of such members.

A member of this type has to withstand large temperature changes over time. These temperature changes may be due to the fact that it is totally or at least partially located outdoors, where the temperature depending upon the time of the year may change between $-40°$ C. and $+40°$ C. Furthermore, the load of said high voltage conductor may vary, i.e. the current flowing therethrough may vary so much that the temperature of this conductor and by that of the parts of said elongated member inside said shell may vary considerably. In fact, the temperature of the shell will be mainly determined by the temperature of the environment of said member, whereas the temperature of the internal parts thereof, such as of said medium, will also depend on the intensity of the current flowing through the conductor. The medium of a material with certain electrically insulating properties, which has to fill said gap, will tend to change in volume with the temperature, which means that a pressure will be built up inside the shell upon a temperature rise if the medium is totally enclosed in said shell. This pressure may cause the outer insulator shell to be damaged.

There are two known solutions to this problem. The first is to construct the member with the outer insulator shell so that it is able to withstand the pressure built up, which is difficult and costly to obtain. The other solution is to construct the member so that the pressure built-up is taken care of, for instance by connecting said gap filled with a fluid to an expansion vessel, which is both complicated and expensive. Furthermore, this involves a risk of leakage of said medium, which may constitute a fire risk.

SUMMARY OF THE INVENTION

The object of the present invention is to provide a member of the type defined in the introduction advising a different solution to the problem with temperature changes of said member and the parts thereof.

This object is according to the invention obtained by providing such a member in which said medium is formed by an electrically insulating material containing hollow spaces at least partially filled with gas, in which said material is adapted to expand upon a temperature rise thereof by reversibly compressing said hollow spaces and reducing the volume thereof.

This means that instead of a high pressure built up upon a temperature rise of said medium the material is allowed to expand in itself by compressing said hollow spaces, so that the pressure may be reduced. Thus, the insulator shell may be protected against damage without overdimensioning it, and no complicated and costly arrangements for taking care of a pressure built-up have to be accomplished.

According to an embodiment of the invention said hollow spaces are formed by deformable spheres adapted to after deformation resume their shape when external compressive forces from said material are reduced as a consequence of a temperature decrease. This constitutes an advantageous way of obtaining said hollow spaces providing a flexible nature of said medium with respect to temperature changes. It is even possible that said hollow spaces expand and increase in volume with respect to a state thereof at room temperature when the temperature falls below room temperature.

According to another embodiment of the invention said material is a cross-linked gel with microspheres embedded therein. The combination of such a gel with microspheres provides the possibility to conveniently select a relation of a total volume of said hollow spaces with respect to the total volume of said gap suitable for the intended use of said member.

According to another embodiment of the invention said microspheres have a diameter of 10 μm-100 μm when not deformed. It has turned out that these are suitable dimensions of such hollow spaces for ensuring the maintenance of excellent electrically insulating properties of said medium aimed at.

According to another embodiment of the invention said microspheres are expanded microspheres.

According to another embodiment of the invention said microspheres are filled with a mixture of liquid and gas, in which the gas content is adapted to increase with the temperature of said material and thereby of the microspheres. Thanks to the increase of gas content with a temperature increase the volume reduction of said microspheres is facilitated with increasing temperatures. According to another embodiment of the invention said microspheres are filled with only gas.

According to another embodiment of the invention the total volume of said hollow spaces is at room temperature 10-50%, preferably 20-40%, of the total volume of said medium and accordingly of said gap. This means an ability of said material to expand considerably while reducing the volume of said hollow spaces without substantially increasing the pressure upon parts of the member defining said gap.

According to another embodiment of the invention said medium is filled into said gap to have an overpressure therein, i.e. influencing the internal walls of said shell, with a pressure P of 0<P<2 bar at room temperature. Such an overpressure at room temperature has turned out to be sufficient for ensuring that the entire gap is totally filled with said medium also at lower temperatures of said member.

According to another embodiment of the invention said conductor is a conductor tube extending through substantially the entire shell.

According to a further embodiment of the invention said gap separates the internal walls of the shell from an active core of the member comprising said conductor. Thus, said gap has not to fill the entire volume between said conductor and the outer shell, and according to an embodiment of the invention said member is a bushing designed for leading a high voltage conductor through a wall and said active core then comprises electrical field distributing capacitor surrounding said conductor, so that the electrical field will be nearly constant from said conductor and outwards towards the insulator shell. "Wall" is here to be given a wide meaning and may just as well be a wall of a casing, such as a transformer casing, as a wall of a building.

According to another embodiment of the invention said shell is a ceramic sleeve, preferably with outer flanges. This ceramic sleeve may at the ends thereof be secured to metal flanges, for instance of aluminium.

According to another embodiment of the invention the member is designed to have said conductor on a system voltage of at least 12 kV, such as 12 kV-800 kV, especially 50 kV-800 kV. These are conceivable ranges for the voltage of the conductor in a member to which the present invention is directed.

According to another embodiment of the invention said member is designed to have a current of at least 1 A, such as 1 A-100 kA, especially 500 A-25 kA, to flow through the conductor thereof. Such current intensities may typically occur in applications where a member of this type is useful, and changes of these currents may cause considerable temperature changes of said medium in said gap.

According to another embodiment of the invention the member is a bushing to be arranged at a high voltage converter station for leading a high voltage conductor through a wall of a current valve hall and outdoors or from one such hall to another such hall. The member may also be a bushing adapted to be connected to the outer casing of any high voltage apparatus, such as a bushing adapted to be connected to a high voltage disconnector, where there is a need to insulate a conductor with respect to an earthed plane it has to pass.

According to another embodiment of the invention the member may be a transformer bushing or a generator bushing, or it may be a wall bushing.

According to another embodiment of the invention said member is designed to be arranged on the circumference of a bushing for leading a high voltage conductor through a wall for tapping a voltage from this bushing. Temperature changes of the said electrically insulating medium of such a member may also constitute a severe problem with respect to pressure built-up wouldn't said material be able to expand by reducing the volume of said hollow spaces.

According to another embodiment of the invention said member is designed as a cable termination adapted to have a high voltage cable connected to one end thereof. Such cable terminations may be used for connecting an electrical cable, such as a PEX-cable to a power line of a high voltage network, a transformer or a gas-insulated switchgear in which said member may be arranged to stand on the ground at the cable end thereof.

The invention also relates to a use of a member according to the invention as a wall bushing, a transformer or a generator bushing or as a cable termination or as a high voltage apparatus.

Further advantages as well as advantageous features of the invention will appear from the following description of embodiments thereof.

BRIEF DESCRIPTION OF THE DRAWINGS

With reference to the appended drawings, below follows a specific description of embodiments of the invention cited as examples.

In the drawings:

FIG. 1 shows a transformer bushing according to a first embodiment of the invention in a partially longitudinally sectioned view, FIG. 2 is an enlarged view of a part of the shell and portions inside thereof of the bushing according to FIG. 1 as well as two enlargements showing the structure of a medium of an electrically insulating material in said bushing at two different temperatures of said medium, FIG. 3 is a partially section view illustrating a member according to a second embodiment of the invention arranged on the circumference of a bushing for leading a high voltage conductor through a wall for tapping a voltage from this bushing, and FIG. 4 is a partially section view of a member according to a third embodiment of the invention in the form of a cable termination.

DETAILED DESCRIPTION OF EMBODIMENTS OF THE INVENTION

FIG. 1 illustrates an elongated member according to an embodiment of the invention in the form of a transformer bushing having an outer sleeve-like rigid ceramic or polymer insulator shell 1 with outer flanges 2, which shell may have a length in the order of 1 dm-10 m and is secured at the ends to metal flanges 3, 4, which may be of aluminium. A high voltage conductor 5 in the form of a tube, such as an aluminium or copper tube, extend throughout the entire shell 1 for connecting to the transformer at one end and to a high voltage conductor of a high voltage network at the other end (see contact pin 6). The conductor 5 is surrounded by electrical field distributing capacitors in the form of a number of layers 9 of for instance alternatingly paper and metal wound therearound. These number of layers and accordingly the number of capacitors are reduced at the end 7 distant to the connection of the bushing to the transformer casing 8 as well as at the end thereof immerged into an oil bath 25 inside the transformer casing. This means that the electric field will be substantially constant gradually from the conductor 5 and outwards towards the shell 1. Furthermore, the cone-like shape of the capacitor layer 9 results in a smooth electrical field in the axial direction inside the bushing. In the radial direction the entire field will be taken by the bushing where the capacitor layer 9 is thick, whereas a part thereof will be taken by the bushing and a part by the air at the end 7 remote from earth potential and a part by the capacitor layer and a part by the oil bath at the other end.

Furthermore, a gap 10 is formed inside the shell 1 next to the internal wall of the shell, and this gap is filled with a medium 11 of a material with electrically insulating properties. This material contains expanded hollow microspheres, filled with gas or a liquid/gas-mixture mixed into a silicone gel, or another type of gel. After this mixing the silicone gel cross-links, which results in a compressible gel, the function of which will be explained below with reference to FIG. 2. The total volume of the hollow spaces of the microspheres is at room temperature 10-50% of the total volume of said medium and accordingly of said gap.

The silicone gel with the microspheres contained therein is filled into the gap to have an overpressure therein, i.e. influencing the internal walls 12 of said shell, with a pressure P of $0<P<2$ bar at room temperature. This means in the case of a transformer bushing vertically directed as in FIG. 1 that the overpressure will be lower at the top end 7 than at the lower end owing to the influence of the gravitation.

The function of the medium 11 in said gap 10 will be as follows. The temperature of this medium may change as a consequence of changes of the outdoor temperature when said shell is located outdoors and as a consequence of changes of the intensity of a current flowing through the conductor 5. It is shown in FIG. 2 what happens when the temperature of said medium increases resulting in a change of the condition of said medium from A to B. Accordingly, the gel 13 will expand while compressing the microspheres 14 and by that reducing the volume thereof keeping any pressure built up inside the shell at an acceptable low level. The microspheres are in this way reversibly compressed, which means that they will expand and increase in volume when the temperature of said medium sinks again.

FIG. 3 illustrates a member 15 according to another embodiment of the invention which is also present in FIG. 1, designed to be arranged on the circumference of the bushing for tapping a voltage from this bushing. This is obtained by a wire 16 extending into the layer 9 of capacitors and connecting to a capacitor on a potential differing considerably from earth, which will be the potential of the outermost capacitor layer bearing against the metallic flange 17. Thus, this wire 16 has to be electrically insulated with respect to the flange 17, and a gap 10 surrounding this wire 16 is filled with a medium 11 of the type described above. Thus, this medium 11 will act according to above when the temperature thereof is changing protecting an insulator body 18 surrounding the wire against damage as a consequence of pressure built up inside the gap 10 filled with said medium.

FIG. 4 illustrates a member according to a third embodiment of the invention in the form of a cable termination. Parts thereof corresponding to part of the bushing in FIG. 1 have been provided with the same reference numerals. This cable termination has a cable clamp 20 at one end thereof, to which a high voltage cable 21, such as a PEX-cable, is connected. This clamp 20 is connected to a conductor tube 5, extending inside the ceramic shell 1 to the other end thereof for connection to an overhead line 22 of a high voltage network. The bottom end of the cable termination is preferably secured to a ground plate 23 by an aluminium flange 24. The gap 10 between the conductor 5 and the shell 1 is filled with a medium 11 of the type described above in connection with FIGS. 1 and 2 resulting in the same behaviour and advantages as mentioned above.

The invention is of course not in any way restricted to the embodiments thereof described above, but many possibilities to modifications thereof would be apparent to a person with ordinary skill in the art without departing from the basic idea of the invention as defined in the appended claims.

Said hollow spaces may have other shapes than as a sphere, and they may be closed cells formed and delimited by the material forming the rest of said medium.

The invention claimed is:

1. An elongated member, comprising:
an outer sleeve-like rigid insulator shell;
a high voltage conductor extending in a longitudinal direction of the shell and surrounded by the shell;
a gap inside the shell next to an internal wall of the shell at least partially surrounding said conductor; and
a medium comprising a material having electrically insulating properties arranged in the gap, said medium comprising an electrically insulating material comprising hollow spaces at least partially filled with gas, wherein said material is adapted to expand upon a temperature rise thereof by reversibly compressing said hollow spaces and reducing the volume thereof, wherein said hollow spaces comprise deformable spheres adapted to after deformation resume their shape when external compressive forces from said material are reduced as a consequence of a temperature decrease, wherein said material comprises a cross-linked gel including microspheres embedded therein, and wherein said microspheres are filled with a mixture of liquid and gas, in which the gas content is adapted to increase with the temperature of said material and thereby of the microspheres.

2. The member according to claim 1, wherein said microspheres have a diameter of 10 micrometers-100 micrometers when not deformed.

3. The member according to claim 1, wherein said gel comprises a silicone gel.

4. The member according to claim 1, wherein said microspheres are expanded microspheres.

5. The member according to claim 1, wherein said microspheres are filled with only gas.

6. The member according to claim 1, wherein a total volume of said hollow spaces is at room temperature 10-50 percent of the total volume of said medium and accordingly of said gap.

7. The member according to claim 1, wherein said medium is filled into said gap to have an overpressure therein, thereby influencing the internal wall of said shell, with a pressure P of $0<P<2$ bar at room temperature.

8. The member according to claim 1, wherein said conductor comprises a conductor tube extending through substantially the entire shell.

9. The member according to claim 1, wherein said gap separates the internal wall of the shell from an active core of the member comprising said conductor.

10. The member according to claim 9, wherein said active core comprises electrical field distributing capacitors surrounding said conductor.

11. The member according to claim 1, wherein said shell comprises a ceramic or polymer sleeve.

12. The member according to claim 11, further comprising:
metal flanges secured to ends of said ceramic or polymer sleeve.

13. The member according to claim 1, wherein the member is designed to have said conductor on a system voltage of at least twelve kilovolts.

14. The member according to claim 1, wherein the member is designed to have a current of at least one amp to flow through the conductor thereof.

15. The member according to claim 1, wherein the member is a bushing designed for leading the high voltage conductor through a wall.

16. The member according to claim 15, wherein the member is a bushing to be arranged at a high voltage converter station for leading a high voltage conductor through a wall of a current valve hall and outdoors or from one such hall to another such hall.

17. The member according to claim 15, wherein the member is a bushing adapted to be connected to the outer casing of any high voltage apparatus.

18. The member according to claim 17, wherein the member is a bushing adapted to be connected to a high voltage disconnector.

19. The member according to claim 15, wherein the member is a transformer bushing or a generator bushing.

20. The member according to claim 15, wherein the member is a wall bushing.

21. The member according to claim 1, wherein the member is designed to be arranged on a circumference of a bushing for leading the high voltage conductor through a wall for tapping a voltage from this bushing.

22. The member according to claim 1, wherein the member is designed as a cable termination adapted to have the high voltage cable connected to one end thereof.

23. An elongated member, comprising:
an outer sleeve-like rigid insulator shell;
a high voltage conductor extending in a longitudinal direction of the shell and surrounded by the shell;
a gap inside the shell next to an internal wall of the shell at least partially surrounding said conductor; and
a medium comprising a material having electrically insulating properties, said medium comprising an electrically insulating material comprising hollow spaces at least partially filled with gas, said material being adapted to expand upon a temperature rise thereof by reversibly compressing said hollow spaces and reducing the volume thereof, said hollow spaces being formed by deformable spheres adapted to after deformation resume their shape when external compressive forces from said material are reduced as a consequence of a temperature decrease, said material comprising a cross-linked gel including microspheres embedded therein, wherein said microspheres are filled with a mixture of liquid and gas, in which the gas content is adapted to increase with the temperature of said material and thereby of the microspheres.

24. The member according to claim 23, wherein a total volume of said hollow spaces is at room temperature 10-50% of the total volume of said medium and accordingly of said gap.

25. The member according to claim 23, wherein the member is a wall bushing.

26. The member according to claim 23, wherein the member is a transformer or generator bushing.

27. The member according to claim 23, wherein the member is a cable termination.

28. The member according to claim 23, wherein the member is a high voltage apparatus.

* * * * *